3,386,970
PROCESS FOR THE COPOLYMERIZATION OF CARBON BISULFIDE AND A FREE RADICAL POLYMERIZABLE MATERIAL

Harold M. Pitt, Lafayette, Calif., assignor to Stauffer Chemical Company, New York, N.Y., a corporation of Delaware
No Drawing. Filed June 20, 1966, Ser. No. 559,678
8 Claims. (Cl. 260—79)

ABSTRACT OF THE DISCLOSURE

The process for the copolymerization of carbon bisulfide and a free radical polymerizable material in the presence of a free radical initiator and an alkyl aluminum halide.

---

This invention relates to the copolymerization of carbonbisulfide with certain free radical polymerizable or copolymerizable organic material in the presence of Lewis acids non-reactive toward carbon bisulfide. More specifically, this invention pertains to the free radical polymerization of carbon bisulfide with certain organic materials by the use of free radical initiators in the presence of Lewis acids selected from the group consisting of alkyl aluminum sesquihalides, alkyl aluminum dihalides and dialkyl aluminum bromides. Said alkyl groups containing from 1 to about 8 carbon atoms.

It has been found, that while carbon bisulfide can be homopolymerized only at exceedingly high pressures, carbon bisulfide may be copolymerized by a free radical mechanism according to the instant invention with certain monomers selected from the group consisting of ethylene, vinyl chloride, vinyl fluoride, vinylidene chloride and vinylidene fluoride, and combinations thereof, in the presence of a Lewis acid selected from the group consisting of alkyl aluminum sesquihalides, alkyl aluminum bromides, and alkyl aluminum dihalides. The copolymers incorporating carbon bisulfide produced according to the instant invention were found to be thermoplastic and extremely solvent resistant.

Lewis acids which are suitable in this reaction include broadly all alkyl aluminum sesquihalides, especially chlorides and bromides, alkyl aluminum dihalides, especially chlorides and bromides, and dialkyl aluminum bromides, said alkyl groups containing from 1 to about 8 carbon atoms. Examples of these classes of compounds are the methyl-, ethyl-, propyl-, butyl-, pentyl-, hexyl-, heptyl-, and octyl-aluminum sesquihalides and aluminum dihalides; and dialkyl aluminum bromides such as dimethyl aluminum bromide, diethyl aluminum bromide, dipropyl aluminum bromide, dibutyl aluminum bromide, and the like. The foregoing compounds, however, may only indicate how broad the class of possible Lewis acid reactants really is and shall not restrict in any way this invention.

The copolymerization process of the present invention can be conveniently carried out by the use of free radical generators at temperatures between about −10° C. and about 100° C. in a suitable pressure vessel to withstand the autogenous pressure developed.

One such method is by copolymerizing carbon bisulfide with the selected free radical polymerizable monomer or monomers in the presence of a free radical initiator in the presence of a Lewis acid selected from the group consisting of alkyl aluminum sesquihalides, alkyl aluminum dihalides and dialkyl aluminum bromides under superatmospheric pressures at temperatures above ambient. The resulting copolymers contain up to about 10% by weight of sulfur and are useful as thermoplastic molding compositions and solvent resistant materials. Films and sheets have been successfully formed from these copolymers.

In greater detail, the monomers that may be used in the copolymerization process herein described must be free of oxygen and sulfur. Monomers containing oxygen or sulfur atoms tend to neutralize the alkyl aluminum halide Lewis acids employed to assist the copolymerization and thereby inhibit the preparation of suitable copolymers. Among the monomers operable within the instant process are ethylene, vinyl chloride, vinyl fluoride, vinylidene chloride, vinylidene fluoride and copolymers thereof. A free radical initiator is employed to catalyze the polymerization reaction. Such free radical initiators are familiar to those skilled in the art. Typical free radical initiators are bisazoisobutyronitrile, benzoyl peroxide, and bromotrichloromethane. The Lewis acids must be soluble in the copolymerization solvent system and nonreactive toward carbon bisulfide, since excess carbon bisulfide is conveniently used as a solvent in the process. It has been found that the use of carbon bisulfide as a solvent for the reaction functions well as a diluent, dispersant and at the same time allows a higher concentration of carbon bisulfide for reaction and copolymerization with the selected monomer. Preferably, the Lewis acids are selected from the group consisting of alkyl aluminum sesquihalides, alkyl aluminum dihalides and dialkyl aluminum bromides; said alkyl groups containing from 1 to 8 carbon atoms.

In general, the instant copolymerization reaction was carried out by charging a suitable pressure vessel with carbon bisulfide, the selected monomer, a free radical initiator and alkyl aluminum sesquihalide, alkyl aluminum dihalides or dialkyl aluminum bromides. Said pressure vessel must be capable of sustaining the autogenous pressure developed during the copolymerization reaction. At the end of the polymerization reaction the polymer was treated to remove the residues of unreacted catalysts. Various procedures known to those skilled in the art are available in order to remove these residues and yield polymer with the optimum color and minimum ash content. Generally, the aluminum alkyl halide compounds were decomposed by the use of water or alcohol. Further treatments of washing, filtering and drying may be applied for purifying the copolymers herein prepared.

Although carbon bisulfide will copolymerize with vinyl chloride, for example, in the presence of free radical initiators at higher than ambient temperature, surprisingly by performing the copolymerization in the presence of dialkyl aluminum bromides, alkyl aluminum sesquihalide or alkyl aluminum dihalides, it was found that the amount of sulfur incorporated in the copolymer thereby produced was greatly increased per unit molecular weight. Therefore, the copolymers produced according to the instant invention possess different solubility characteristics, temperature working properties, material strength properties and the like, as differentiated from copolymers produced from carbon bisulfide and said free radical polymerizable monomers in the absence of said aluminum alkyl halides.

Numerous copolymerizations of carbon bisulfide and vinyl chloride, as a representative free radical polymerizable monomer, have been made according to the above described process.

The following examples of copolymerizations involving various process systems are given for purpose of illustration.

EXAMPLE

Coke bottle-type pressure containers were used to carry out the following experimental preparations. In general, each Coke bottle-type container had an approximate volume of 300 cc. The containers were charged with the reactants: carbon bisulfide, vinyl chloride, a free radical initiator catalyst, bisazoisobutyronitrile (VAZO), and either ethyl aluminum sesquichloride (EASC) or diethyl aluminum bromide (DEAB) as the Lewis acid catalyst. The containers were sealed and heated in a liquid heating bath to the indicated temperature. Generally, the containers were heated for about 15 to about 60 hours.

After a time when the copolymerization was complete, the containers were cooled and any excess or unreacted vinyl chloride was removed by degassing. Unreacted carbon bisulfide was removed under reduced pressure. The remaining polymeric material was washed with ether. This wash procedure essentially removed the ethyl aluminum sesquichloride and diethyl aluminum bromide catalysts. Significantly the major portion of the copolymer was insoluble in the ether wash. The following table summarizes the experiments performed according to the instant process.

TABLE.— COPOLYMERIZATION OF VINYL CHLORIDE AND CARBON BISULFIDE

| Run | Carbon bisulfide, cc. | Vinyl chloride, cc. | VAZO [4], grs. | Lewis Acid, cc. | Temp., °C. | Yield, g. | Percent Sulfur |
|---|---|---|---|---|---|---|---|
| 1 | 200 | 75 | .2 | [2] 1.0 | 55 | 15 | 1.5 |
| 2 | 200 | 75 | .2 | [3] 1.0 | 55 | 5 | 1.75 |
| 3 | 200 | 75 | .3 | [2] 1.0 | 55 | 2.0 / 12.5 | 1.3 / [1] 1.1 |
| 4 | 150 | 125 | .4 | [2] 1.0 | 55 | 25 | .8 |
| 5 | 150 | 150 | .2 | [2] 1.0 | 45 | 24 | .5 |
| 6 | 200 | 75 | .2 | ([2]) | 59 | 7.8 | 1.8 |

[1] Ether sol.
[2] EASC = Ethyl aluminum sesquichloride.
[3] DEAB = Diethyl aluminum bromide.
[4] VAZO = Bisazoisobutyronitrile.

Run 3 illustrates the insolubility of copolymers produced by the instant process wherein higher sulfur content imparts increased solvent resistance. The ether insoluble portions from Runs 3 and 6, as did the comparable material from the other runs, exhibited solvent resistance to tetrahydrofuran. Thus, the present invention provides a new and useful polymerization reaction, by which a highly insoluble and thermoplastic polymer may be conveniently obtained.

Various changes and modifications may be made in the process described herein as will be apparent to those skilled in the chemical arts. It is accordingly intended that the present invention only be limited by the scope of the appended claims.

I claim:
1. A process for the copolymerization of carbon bisulfide and a free radical polymerizable material selected from the group consisting of ethylene, vinyl chloride, vinyl fluoride, vinylidene chloride, vinylidene fluoride and combinations thereof, comprising contacting under autogenous pressure at temperatures between about −10° C. and about 100° C. carbon bisulfide and said free radical polymerizable material in the presence of a free radical initiator and a catalyst selected from the group consisting of alkyl aluminum sesquihalides, alkyl aluminum dihalides and dialkyl aluminum bromides, wherein said alkyl groups contain from 1 to about 8 carbon atoms.

2. The process according to claim 1 wherein said catalyst is ethyl aluminum sesquichloride.

3. The process according to claim 1 wherein said catalyst is diethyl aluminum bromide.

4. The process according to claim 1 wherein said free radical initiator is bisazoisobutyronitrile.

5. A process for the copolymerization of carbon bisulfide and vinyl chloride comprising contacting under autogenous pressure at temperatures between about −10° C. and about 100° C. carbon bisulfide and vinyl chloride in the presence of a free radical initiator and a catalyst selected from the group consisting of alkyl aluminum sesquihalides, alkyl aluminum dihalides and dialkyl aluminum bromides, wherein said alkyl groups contain from 1 to about 8 carbon atoms.

6. The process according to claim 5 wherein said catalyst is ethyl aluminum sesquichloride.

7. The process according to claim 5 wherein said catalyst is diethyl aluminum bromide.

8. The process according to claim 5 wherein said free radical initiator is bisazoisobutyronitrile.

References Cited

UNITED STATES PATENTS

| | | | |
|---|---|---|---|
| 3,081,287 | 3/1963 | Coover et al. | 260—93.7 |
| 3,159,607 | 12/1964 | D'Alelio | 260—94.9 |
| 3,326,879 | 6/1967 | Yamada et al. | 260—93.7 |

DONALD E. CZAJA, *Primary Examiner.*

M. I. MARQUIS, *Assistant Examiner.*